United States Patent
Vrlika et al.

(10) Patent No.: US 11,457,056 B2
(45) Date of Patent: Sep. 27, 2022

(54) METHODS OF HANDLING AN OVERLOAD SITUATION OF A SESSION INITIATION PROTOCOL, SIP NODE IN A TELECOMMUNICATION NETWORK, AS WELL AS RELATED SIP NODES

(71) Applicant: Telefonaktiebolaget LM Ericsson (publ), Stockholm (SE)

(72) Inventors: Vlado Vrlika, Zagreb (HR); Michalis Diamantopoulos, Patras (GR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/282,639

(22) PCT Filed: Sep. 18, 2018

(86) PCT No.: PCT/EP2018/075209
§ 371 (c)(1),
(2) Date: Apr. 2, 2021

(87) PCT Pub. No.: WO2020/057731
PCT Pub. Date: Mar. 26, 2020

(65) Prior Publication Data
US 2021/0352129 A1    Nov. 11, 2021

(51) Int. Cl.
*H04L 65/80* (2022.01)
*H04L 69/40* (2022.01)
(Continued)

(52) U.S. Cl.
CPC .......... *H04L 65/80* (2013.01); *H04L 65/1045* (2022.05); *H04L 65/1104* (2022.05); *H04L 69/40* (2013.01); *H04W 48/06* (2013.01)

(58) Field of Classification Search
CPC ... H04L 65/80; H04L 65/1006; H04L 65/105; H04L 69/40; H04W 48/06
See application file for complete search history.

(56) References Cited

U.S. PATENT DOCUMENTS

| 2010/0027532 A1 | 2/2010 | Sparks et al. |
| 2010/0030914 A1* | 2/2010 | Sparks ................ H04L 47/2433 709/235 |
| 2017/0332276 A1* | 11/2017 | Gonzalez de Langarica ............. H04L 65/1076 |

OTHER PUBLICATIONS

International Search Report and Written Opinion dated Mar. 29, 2019 for International Application No. PCT/EP2018/075209 filed Sep. 18, 2018, consisting of 9-pages.

(Continued)

*Primary Examiner* — Suraj M Joshi
(74) *Attorney, Agent, or Firm* — Christopher & Weisberg, P.A.

(57) ABSTRACT

A method of handling an overload situation of a Session Initiation Protocol, SIP, node in a telecommunication network, wherein the method includes the steps of receiving, by a proxy SIP node in the telecommunication network, an SIP request for requesting a service in the telecommunication network, forwarding, by the proxy SIP node, the SIP request to a service SIP node in the telecommunication network, receiving, by the proxy SIP node, from the service SIP node, a Server Failure Response message, wherein the Server Failure Response message includes an indication that the service node cannot fulfil the SIP request due to an overload situation at the service SIP node, and restricting, by the proxy SIP node, future SIP traffic to the service SIP node based on the received Server Failure Response message.

20 Claims, 4 Drawing Sheets

(51) Int. Cl.
- *H04W 48/06* (2009.01)
- *H04L 65/1045* (2022.01)
- *H04L 65/1104* (2022.01)

(56) References Cited

OTHER PUBLICATIONS

J. Rosenberg et al.; SIP: Session Initiation Protocol; Network Working Group; RFC 3261; The Internet Society, Jun. 2002, consisting of 269-pages.

H. Schulzrinne et al.; The Reason Header Field for the Session Initiation Protocol (SIP); Network Working Group; RFC 3326; The Internet Society, Dec. 2002, consisting of 8-pages.

V.Gurbani et al.; Session Initiation Protocol (SIP) Overload Control; RFC 7339; Internet Engineering Task Force (IETF); Sep. 2014, consisting of 38-pages.

Normative Information; ND1007:2007/01; TSG/SPEC/007; ISDN User Part (ISUP); Network Interoperability Consultative Committee, Ofcom; Issue 3.3, Jan. 2007, consisting of 184-pages.

Series E: Overall Network Operation, Telephone Service, Service Operation and Human Factors; E.412; Network management—International network management; Network management controls; International Telecommunication Union; Telecommunication Standardization Sector of ITU; Jan. 2003, consisting of 30-pages.

Series Q: Switching and Signalling Specifications of Signalling System No. 7—ISDN user part signalling procedures; Q.764; International Telecommunication Union; Telecommunication Standardization Sector of ITU; Dec. 1999, consisting of 110-pages.

E. Noel et al.; Session Initiation Protocol (SIP) Rate Control; Internet Engineering Task Force (IETF); Request for Comments: 7415; IETF Trust; Feb. 2015, consisting of 15-pages.

\* cited by examiner

METHODS OF HANDLING AN OVERLOAD SITUATION OF A SESSION INITIATION PROTOCOL, SIP NODE IN A TELECOMMUNICATION NETWORK, AS WELL AS RELATED SIP NODES

CROSS-REFERENCE TO RELATED APPLICATION

This application is a Submission Under 35 U.S.C. § 371 for U.S. National Stage Patent Application of International Application Number: PCT/EP2018/075209, filed Sep. 18, 2018 entitled "METHODS OF HANDLING AN OVERLOAD SITUATION OF A SESSION INITIATION PROTOCOL, SIP NODE IN A TELECOMMUNICATION NETWORK, AS WELL AS RELATED SIP NODES," the entirety of which is incorporated herein by reference.

Methods of handling an overload situation of a Session Initiation Protocol, SIP node in a telecommunication network, as well as related SIP nodes

TECHNICAL FIELD

The present disclosure is related to overload situations that occur at a Session Initiation Protocol, SIP, node, and, more specifically, to methods for handling such an overload situation.

BACKGROUND

The Session Initiation Protocol, SIP, is a signalling protocol, widely used for setting up, connecting and disconnecting communication sessions, typically voice or video calls over the public communication network like the internet. SIP is a standardized protocol, which is becoming one of the most dominant industry standards.

The protocol can be used for setting up, modifying and terminating two-party, i.e. unicast, or multiparty, i.e. multicast, sessions consisting of one or more media streams. Modifications can include changing Internet Protocol, IP, addresses or/or ports, inviting more User Equipment, UE, and adding or deleting the media streams.

SIP is an application layer control protocol that supports five parts of making and stopping communications. It does not provide services, therefore it acts with other protocols to provide these services, one of which is typically Realtime Transport Protocol, RTP, that carries the voice for a call.

One or more SIP nodes may be involved in a particular communication process, for example establishing a voice session between two User Equipment, UE, in a telecommunication network.

The present disclosure is directed to overload situations that may occur in one of the SIP nodes that are involved in such a process. Currently, mechanisms already exist for handling an overload situation but these mechanisms are considered to be not adequate. This is explained in more detail here below.

If a particular SIP request is sent to a SIP node that is in an overload situation, that SIP node will return an error message back to the requesting SIP node. The requesting SIP node will simply try again, by sending the SIP request back to the SIP node in the overload situation. The retry process may be executed a couple of times until the overload situation is resolved, or until a maximum number of retries have been reached.

The inventors have found that the above described process is inefficient, and have found an improved method for dealing with an overload situation at a SIP node.

SUMMARY

The present disclosure is directed to methods of efficiently handling an overload situation at a Session Initiation Protocol, SIP, node, such that the overload situation at the SIP node may be resolved quickly.

The present disclosure is also directed to SIP nodes supporting the handling of the overload situation at a Session Initiation Protocol, SIP, node, such that the overload situation at the SIP node may be resolved quickly.

In a first aspect, there is provided a method of handling an overload situation of a Session Initiation Protocol, SIP, node in a telecommunication network.

The method comprises the steps of:

receiving, by a proxy SIP node in said telecommunication network, an SIP request for requesting a service in said telecommunication network;

forwarding, by said proxy SIP node, said SIP request to a service SIP node in said telecommunication network;

receiving, by said proxy SIP node, from said service SIP node, a Server Failure Response message, wherein said Server Failure Response message comprises an indication that said service node cannot fulfil said SIP request due to an overload situation at said service SIP node;

restricting, by said proxy SIP node, future SIP traffic to said service SIP node based on said received Server Failure Response message.

It was found that it is advantageous in case the service SIP nodes actually indicates, in the Server Failure Response message, that it cannot fulfil the SIP request due to an overload situation. This indication is then used, by the proxy SIP node, to restrict future SIP traffic to the service SIP node.

The method prevents that the proxy SIP node sends out a plurality of retry messages, which would cause the service SIP node to get overloaded even further. The proxy SIP node is aware that the service SIP node is in an overload situation, and may, for example, try to find a different route, or a different service SIP node to continue with its SIP request.

It is noted that an overload situation, in accordance with the present disclosure, may be directed to a situation in which a processor of the service SIP node is overloaded, in which communication units of the service SIP node are overloaded, in which a memory of the service SIP node is overloaded, or anything alike. It means that the service Sip node is congested.

In other words, the current SIP protocol provides a limited mechanism for overload control through its 503 (Service Unavailable) response message and the optional Retry-After header. Such 503 response is sent by the overloaded SIP node, where Retry-After header, when present, allows an overloaded SIP node to tell an upstream SIP node to back off for a given period of time.

According to studies presented in IETF RFC 5390, the above described process is inefficient, and inventors have found an improved method for dealing with an overload situation at a SIP node.

In an example, the method further comprises the step of:

transmitting, by said proxy SIP node, triggered by said received Server Failure Response message, to a SIP node from which said proxy SIP node initially received said SIP request, a further Server Failure Response message, wherein said further Server Failure Response message does not comprise said indication that said service node cannot fulfil said SIP request due to an overload situation at said service SIP node.

The inventors have found that the indication that the service SIP node is in an overload situation may not be forwarded to the SIP node that initially transmitted the SIP request. The insight is that the initial SIP node does not need to restrict its traffic, as the initial SIP node does not communicated with the service SIP node directly.

In a further example, the received Server Failure Response message, by said proxy node, comprises an indication of a level of said overload situation at said service SIP node, and wherein said step of restricting comprises:

restricting, by said proxy node, an amount of said future SIP traffic to said service SIP node based on said indication of said level of said overload situation.

In a further example, the received Server Failure Response message is a 503 Service Unavailable message.

Preferably, the Server Failure Response message is an already standardized, and available, 503 Service Unavailable message. The proposed indication may be incorporated in the reason head that is optionally carried in the 503 message. This would ensure that the amendments that are to be made to the standard are kept to a minimal.

In a further example, the SIP request is a SIP invite message for requesting a call to be established between two User Equipment, UE, in said telecommunication network.

In a second aspect of the present disclosure, there is provided a method of handling an overload situation of a Session Initiation Protocol, SIP, node in a telecommunication network.

The method comprises the steps of:

receiving, by a service SIP node in said telecommunication network, from a proxy SIP node in said telecommunication network, an SIP request for requesting a service in said telecommunication network;

detecting, by said service SIP node, an overload situation at said service SIP node;

transmitting, by said service SIP node, to said proxy SIP node, a Server Failure Response message, wherein said Server Failure Response message comprises an indication that said service node cannot fulfil said SIP request due to an overload situation at said service SIP node.

The advantages of the first aspect of the disclosure are also inherently a part of the second aspect, and third aspect, of the disclosure. Furthermore, it is pointed out that although the claims read as if all the modules/equipment according to this second aspect of the present disclosure are incorporated into a single node, a person skilled in the art understands that the same disclosure could be implemented by, for example, distributing each of the modules over several nodes. Alternately, the disclosure could also be purely implemented in the cloud, whereby none of the physical nodes possess any of these modules/equipment as such.

Further, it is noted that the equipment may also be referred to as a module, unit, device or anything alike.

In an example, the transmitted received Server Failure Response message, by said service node, comprises an indication of a level of said overload situation at said service SIP node.

The proxy SIP node may then decide, based on the level of the overload situation how the future SIP traffic is to be restricted. For example, the restriction may be based on a particular time window, a particular amount of traffic, or anything alike. The exact choice hereof may be based on the level of the overload situation.

In a further example, the transmitted Server Failure Response message is a 503 Service Unavailable message.

In a further example, the SIP request is a SIP invite message for requesting a call to be established between two User Equipment, UE, in said telecommunication network.

In a third aspect, there is provided a proxy Session Initiation Protocol, SIP, node for supporting the handling of an overload situation of a SIP node in a telecommunication network, wherein said proxy SIP node comprises:

receive equipment arranged for receiving an SIP request for requesting a service in said telecommunication network;

transmit equipment arranged for forwarding said SIP request to a service SIP node in said telecommunication network;

wherein said receive equipment is further arranged for receiving, from said service SIP node, a Server Failure Response message, wherein said Server Failure Response message comprises an indication that said service node cannot fulfil said SIP request due to an overload situation at said service SIP node;

and wherein said proxy SIP node further comprises process equipment arranged for restricting future SIP traffic to said service SIP node based on said received Server Failure Response message.

In an example, the transmit equipment is further arranged for transmitting, triggered by said received Server Failure Response message, to a SIP node from which said proxy SIP node initially received said SIP request, a further Server Failure Response message, wherein said further Server Failure Response message does not comprise said indication that said service node cannot fulfil said SIP request due to an overload situation at said service SIP node.

In a further example, the received Server Failure Response message, by said proxy node, comprises an indication of a level of said overload situation at said service SIP node, and wherein said process equipment is further arranged for restricting an amount of said future SIP traffic to said service SIP node based on said indication of said level of said overload situation.

In another example, the received Server Failure Response message is a 503 Service Unavailable message.

In yet a further example, the SIP request is a SIP invite message for requesting a call to be established between two User Equipment, UE, in said telecommunication network.

In a fourth aspect of the present disclosure, there is provided a service Session Initiation Protocol, SIP, node for supporting the handling of an overload situation of a Session Initiation Protocol, SIP, node in a telecommunication network, wherein said service SIP node comprises:

receive equipment arranged for receiving, from a proxy SIP node in said telecommunication network, an SIP request for requesting a service in said telecommunication network;

detect equipment arranged for detecting an overload situation at said service SIP node;

transmit equipment arranged for transmitting to said proxy SIP node, a Server Failure Response message, wherein said Server Failure Response message comprises an indication that said service node cannot fulfil said SIP request due to an overload situation at said service SIP node.

In an example, the transmitted received Server Failure Response message comprises an indication of a level of said overload situation at said service SIP node.

In a further example, the transmitted Server Failure Response message is a 503 Service Unavailable message.

In an example, the SIP request is a SIP invite message for requesting a call to be established between two User Equipment, UE, in said telecommunication network.

In a fifth aspect of the present disclosure, there is provided a computer program product comprising a computer readable medium having instructions which, when executed by a Session Initiation Protocol, SIP node in a telecommunication network, cause said SIP node to execute a method in accordance with any of method examples as provided above.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
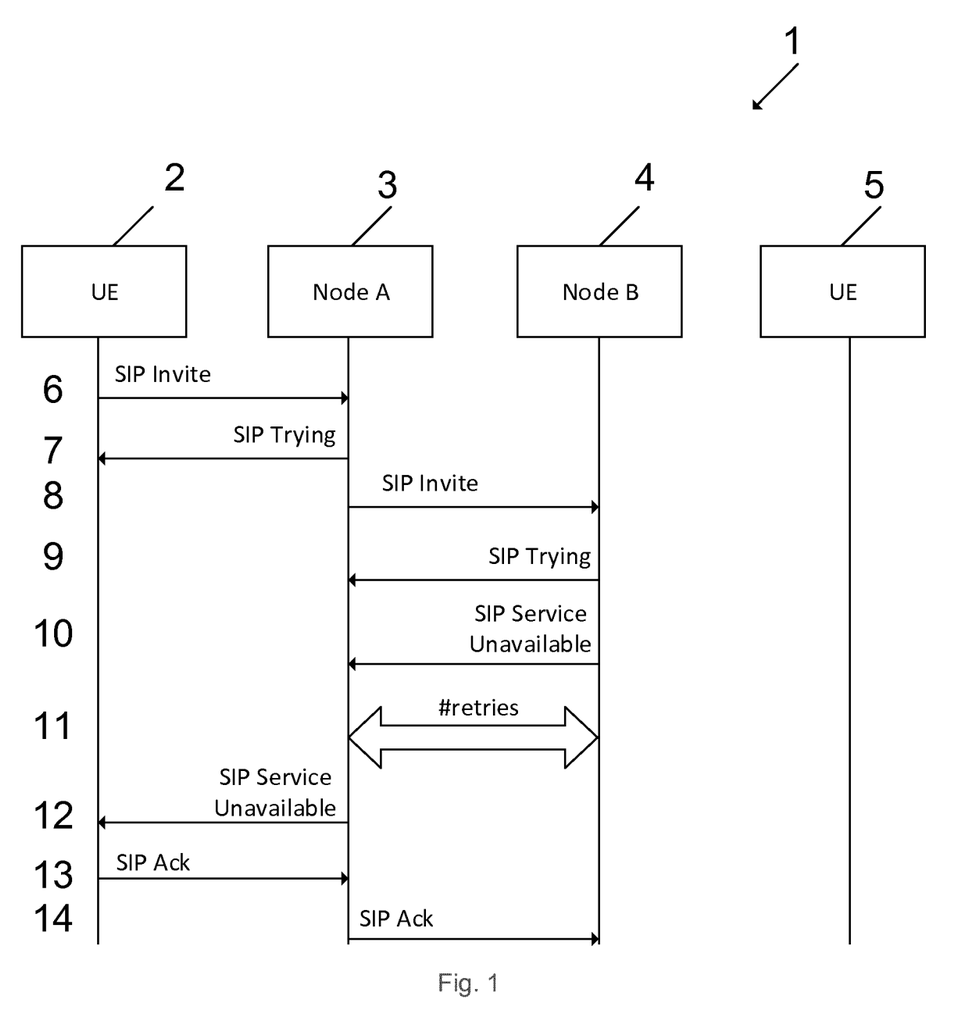
FIG. 1 shows a flow chart in which an SIP invite request is sent from a calling User Equipment to a called User Equipment, in accordance with the prior art.

FIG. 1 shows a flow chart 1 in accordance with the prior art. The flow chart present a method of transmitting a SIP invite request 6 from a calling User Equipment, UE, 2 to a called User Equipment, UE, 5. The method is thus employed in a telecommunication network.

More, specifically, the present disclosure is directed to the Session Initiation Protocol, SIP, which is a signalling protocol used for initiating, maintaining, and terminating real-time sessions that comprise voice, video and messaging applications. SIP is used for signalling and controlling multimedia communication sessions in applications of Internet telephone for voice and video calls, in private Internet Protocol, IP, telephone systems, in instant messaging over IP networks as well as mobile phone calling over Long Term Evolution, VoLTE.

The SIP protocol defines the specific format of messages exchanged and the sequence of communications for cooperation of the participants. SIP is a text-based protocol, incorporating many elements of the Hypertext Transfer Protocol, HTTP, and the Simple Mail Transfer Protocol, SMTP. [A call established with SIP may consist of multiple media streams, but no separate streams are required for applications, such as text messaging, that exchange data as payload in the SIP message.

In the scenario depicted in FIG. 1, the SIP invite request is, initially, received by Node "A" 3. Node A 3 may be any node in the network that is capable of handling SIP invite requests. It is, for example, a SIP proxy node or a SIP gateway node. In the context of the present scenario node A 3 is considered to be a proxy node as it is to proxy the SIP invite request to Node B 4.

First, node A 3 replies to the calling UE 2 that it is trying to setup the SIP call between the calling UE 2 and the called UE 5. This is indicated by transmitting a SIP trying message from the Node A 3 to the calling UE 2.

Subsequently, the Node A 3 forwards the SIP invite message to the node B 4. Node B 4 is considered to be the service SIP node in accordance with the present disclosure.

It does not need to be the node that is actually performing a service. It is a node involved in the service request made by, in this example, the calling UE 2. Again, the SIP invite message 8 is answered by a SIP trying message 9.

Node B 4 may be unavailable to support in handling the SIP invite message as indicated with reference numeral 10. The Node B 4 may transmit a SIP service unavailable message back to the Node A 3 indicating that it is not able to provide its services.

The recipient, i.e. Node A 3, may use that particular message as a trigger for performing a plurality of retries as indicated with reference numeral 11. When all the retries fail as well, the Node A 3 may transmit a SIP service unavailable message 12 back to the calling UE 3 for indicating that it is not able to establish the SIP call as per request of the calling UE 3.

Finally, the SIP service unavailable message 12 may be acknowledged by the calling UE 2 as indicated with reference numeral 13, which acknowledgement may be transmitted by the Node A 3 to the Node B 4 as well, as indicated with reference numeral 14.

Figure 2:
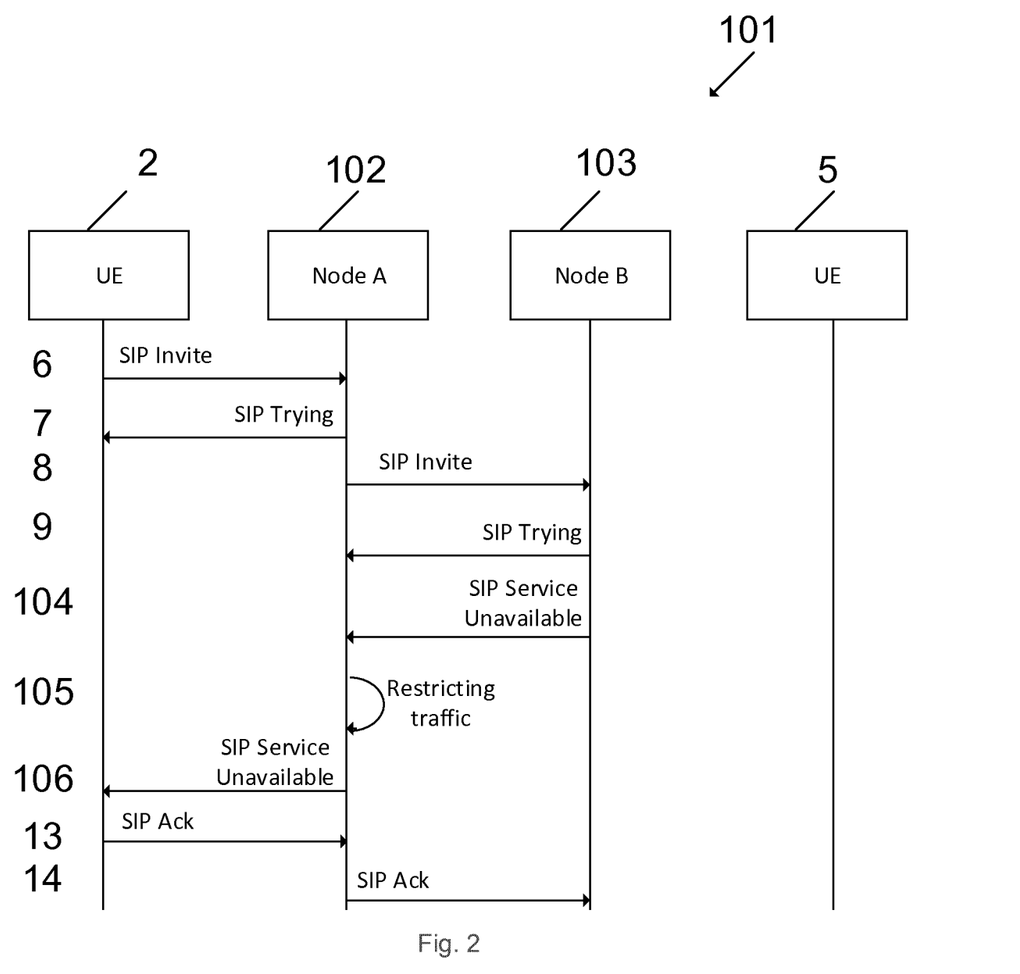
FIG. 2 shows a flow chart in which an SIP invite request is sent from a calling User Equipment to a called User Equipment, in accordance with the present disclosure.

FIG. 2 shows a flow chart 101 in which an SIP invite request is sent from a calling User Equipment to a called User Equipment, in accordance with the present disclosure.

Here, the same reference numerals are used as compared to the reference numerals of FIG. 1 for indicating the same, or similar, function. As such, the steps as indicated with reference numerals 6, 7, 8, 9 are the same steps as indicated in FIG. 1.

The difference with the method as shown in FIG. 1 is that the node A 102 and the node B 103 act different.

First, Node A 102 receives, from Node B 103, the server failure response message 104, wherein the server failure response message comprises an indication that the node B 103 is not able to fulfil the SIP invite request message due to an overload situation at the Node B 103.

The overload situation is, for example, related to the concept that the processor of the Node B 103 is fully occupied, that the messaging queue is too long, that the memory is congested or anything alike. The overload situation means that the Node B 103 is currently not available to process the request by itself.

The Node A 102 then does not need to perform any retries as it already knows, from the SIP service unavailable message 104 that the Node B 103 is overloaded. As such, Node A 102 restricts 105 future traffic to the Node B 103 to ensure that the overload situation at Node B 103 gets resolved as quickly as possible. Node A 102 may also send a SIP service unavailable message back to Node A 102, wherein the particular indication that Node B 103 is overloaded is omitted.

Here below, a detailed implementation is discussed in a bit more detail. The present disclosure is directed to introduce an extension in the SIP protocol which would allow communicating SIP nodes to exchange Automatic Congestion Level, ACL, information in any call release messages.

It allows that communicating SIP nodes deploy ACC or AACC overload control mechanism with relatively low impact and low effort. Such release message in SIP may be unsuccessful final response of class 5xx, preferably the response 503 Service Unavailable. The extension may apply on Reason header optionally carried in 503 message, and may allow that ACC or AACC is indicated as "protocol" with related ACL value.

The proposed method of supporting the ACC/AACC via SIP protocol Reason header extension has the following advantages:

1. It constitutes an explicit feedback, hop-by-hop SIP overload control mechanism that can serve as an alternative to the IETF overload control mechanism, as per IETF RFCs 7339 and 7415, especially for nodes that already support ACC/AACC and do not plan to be adapted to the IETF-based mechanisms.

2. It is able to transfer congestion level information via the existing SIP header with an extension. It offers reliable overload detection in an unambiguous manner based on the presence of the Reason header in 503 responses.

3. Extension of the Reason header field to carry the ACL information does not impact the existing call processing nodes, they can ignore the information which they do not support.

4. It opens a possibility for call-stateful proxies to implement ACC/AACC mechanism, so to increase the SIP overload protection on a network level.

5. It facilitates the implementation and deployment of AACC, which is more advanced and thus recommended compared to ACC. It opens an opportunity that AACC mechanism is used also by IMS and other SIP based call processing nodes.

Figure 3:
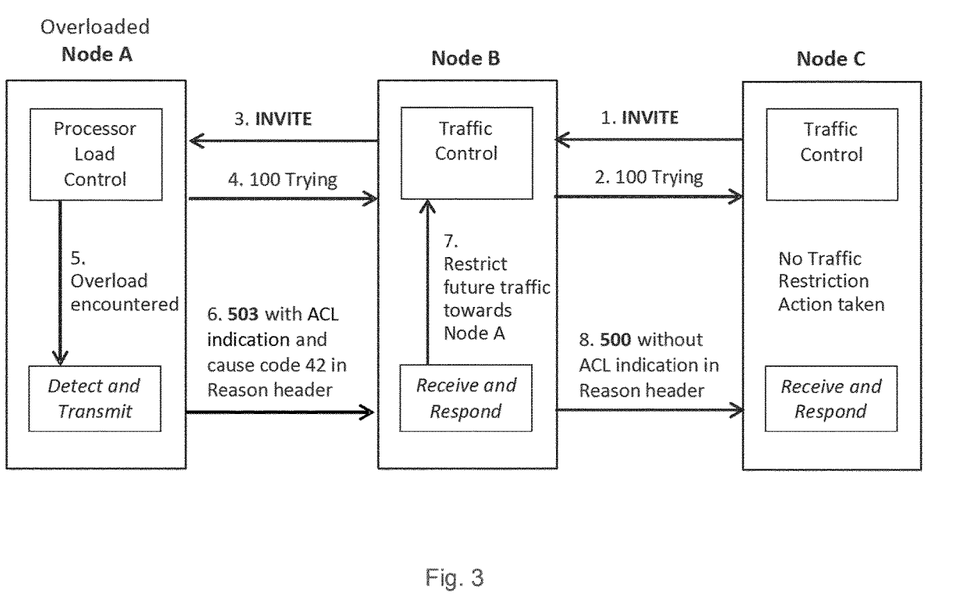
FIG. 3 shows a schematic overview of a method in accordance with the present disclosure.

FIG. 3 shows a schematic overview of a method in accordance with the present disclosure.

Proposed method of SIP traffic congestion control may be based on extension of Reason header and using, existing or new implementations, of ACC/AACC in SIP nodes. A SIP node model with protocol extension where ACC/AACC mechanism is used is shown in FIG. 3.

When overloaded node, which is Node A in this case, rejects a new call, i.e. the initial INVITE request, due to CPU congestion, it normally returns 503 Service Unavailable response. The 503 response message is especially suitable for the gateway nodes like MGCF. The 503 message can optionally carry a Reason header field with protocol value "Q.850" and cause value "42", Switching equipment congestion.

In the present disclosure, it may be the concept that the Reason header, as defined in RFC 3326, is extended such that it is able to carry the ACL information in an additional Reason header field value. The proposed method, in an example, assumes that every SIP 503 response message may carry the ACL information in Reason header, together with Q.850 cause value 42. This may enable that Receive and Respond part of the function in peer SIP node, e.g. Node B as shown in FIG. 3, can react accordingly. Node B may delete the received ACL information when it forwards the 5xx response upstream.

The syntax of Reason header may be the following:

Reason="Reason" HCOLON reason-value*
  (COMMA reason-value)

reason-value=protocol*(SEMI reason-params)

protocol="SIP"/"Q.850"/token reason-params=protocol-cause/reason-text/reason-extension protocol-cause="cause" EQUAL cause cause=1*DIGIT reason-text="text" EQUAL quoted-string reason-extension=generic-param The following values for the protocol field have been defined in RFC 3326:

SIP: The cause parameter contains a SIP status code.

Q.850: The cause parameter contains an ITU-T Q.850 cause value in decimal representation.

Examples are:

Reason: SIP; cause=200; text="Call completed elsewhere"

Reason: Q.850; cause=16; text="Terminated"

Reason: SIP; cause=600; text="Busy Everywhere"

Reason: SIP; cause=580; text="Precondition Failure"

An SIP message may contain more than one Reason value, i.e. multiple Reason lines, but all of them may have different protocol values, e.g. one SIP and another Q.850. An implementation is free to ignore Reason values that it does not understand.

Protocol values, and their associated protocol cause, to be used with this header field may be registered through the Internet Assigned Names, IANA. Reason protocols may refer to either an ITU-T Recommendation number, an IETF protocol name or the recognized protocol identifier from another standardization organization. Protocol cause describes the source of the "cause" field in the Reason header field.

The entries in the registry for the method of overload control in accordance with the present disclosure may be:

| Protocol Value | Protocol Cause | Reason text | Reference |
|---|---|---|---|
| ACC | ACL indicator in decimal representation value: 1 or 2 | "ACLx congestion" where x = 1 or 2 | ITU-T Recommendation E.412 (January 2003), Network Management Controls ITU-T Recommendation Q.764 (December 1999), Signalling system No. 7 -ISDN user part signalling procedures |
| AACC | ACL indicator in decimal representation value: 1 or 2 | "ACLx congestion" where x = 1 or 2 | NICC, ND1007: 2007 January, TSG/SPEC/007 ISDN User Part (ISUP) |

Figure 4:
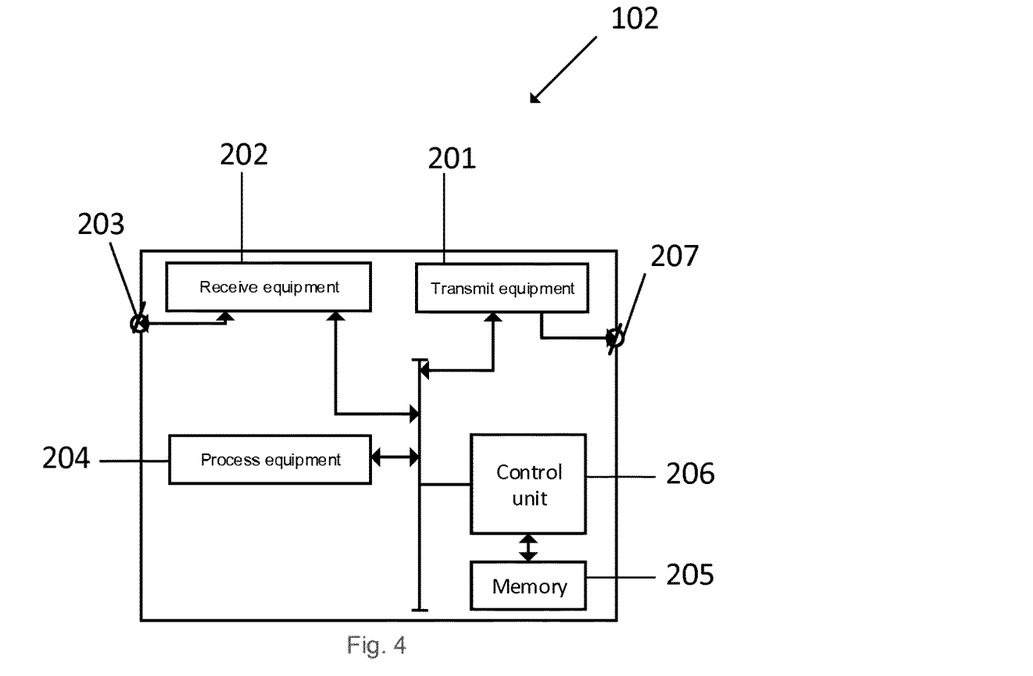
FIG. 4 discloses a schematic view of a proxy SIP node in accordance with the present disclosure.

Here:

ACL=Automatic Congestion Level
ACC=Automatic Congestion Control
AACC=Adaptive Automatic Congestion Control FIG. 4 discloses a schematic view of a proxy SIP node in accordance with the present disclosure.

The proxy Session Initiation Protocol, SIP, node 102 is arranged for supporting the handling of an overload situation of a SIP node in a telecommunication network, wherein said proxy SIP node 102 comprises:

receive equipment 202 arranged for receiving an SIP request for requesting a service in said telecommunication network;

transmit equipment 201 arranged for forwarding said SIP request to a service SIP node in said telecommunication network;

wherein said receive equipment is further arranged for receiving, from said service SIP node, a Server Failure Response message, wherein said Server Failure Response message comprises an indication that said service node cannot fulfil said SIP request due to an overload situation at said service SIP node;

and wherein said proxy SIP node further comprises process equipment 204 arranged for restricting future SIP traffic to said service SIP node based on said received Server Failure Response message.

The proxy SIP node 102 further comprises a receiving terminal 203 through which incoming packets or messages are received, and further comprises a transmitting terminal 207 through which outgoing packets or messages are transmitted.

The proxy SIP node 102 further comprises control unit 206 connected to a memory 205. The control unit 206 is further connected to process equipment 204, transmit equipment 201 and receive equipment 202 via a bus.

Figure 5:
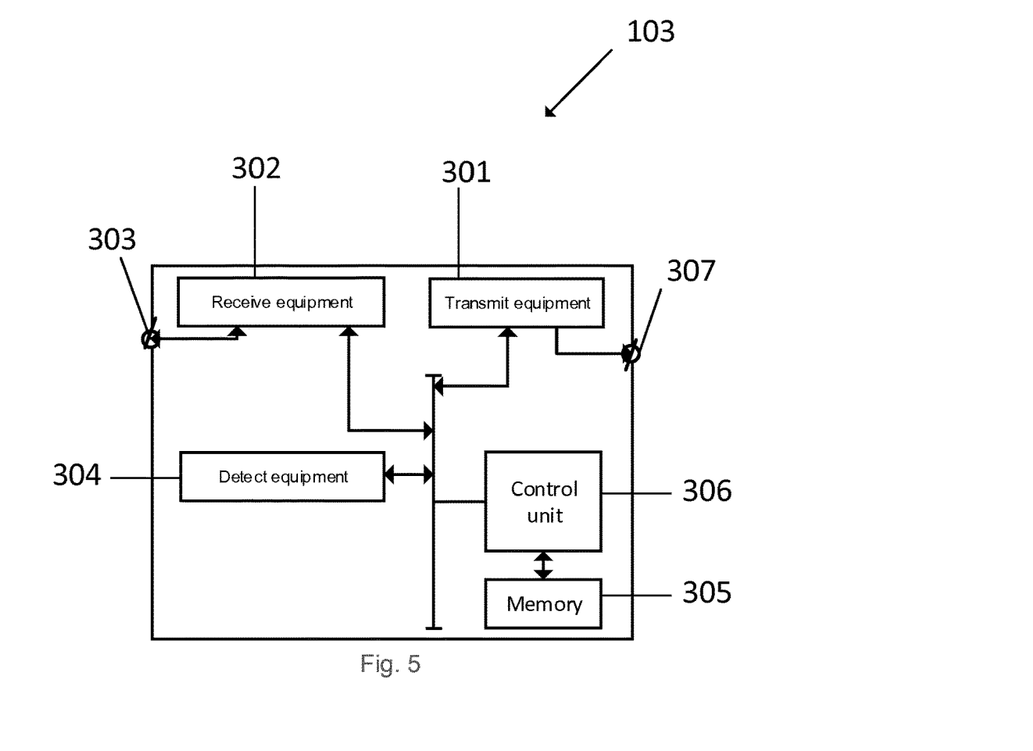
FIG. 5 discloses a schematic view of a service SIP node in accordance with the present disclosure.

FIG. 5 discloses a schematic view of a service SIP node 103 in accordance with the present disclosure.

The service Session Initiation Protocol, SIP, node 103 is arranged for supporting the handling of an overload situation of a Session Initiation Protocol, SIP, node in a telecommunication network, wherein said service SIP node comprises:

receive equipment 302 arranged for receiving, from a proxy SIP node in said telecommunication network, an SIP request for requesting a service in said telecommunication network;

detect equipment 304 arranged for detecting an overload situation at said service SIP node;

transmit equipment 301 arranged for transmitting to said proxy SIP node, a Server Failure Response message, wherein said Server Failure Response message comprises an indication that said service node cannot fulfil said SIP request due to an overload situation at said service SIP node.

The service SIP node 103 further comprises a receiving terminal 303 through which incoming packets or messages are received, and further comprises a transmitting terminal 307 through which outgoing packets or messages are transmitted.

The service SIP node 103 further comprises control unit 306 connected to a memory 305. The control unit 305 is further connected to detect equipment 304, transmit equipment 301 and receive equipment 302 via a bus.

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as optical storage medium or a solid-state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of handling an overload situation of a Session Initiation Protocol, SIP, node in a telecommunication network, the method comprising:

receiving, by a proxy SIP node in the telecommunication network, an SIP request for requesting a service in the telecommunication network;

forwarding, by the proxy SIP node, the SIP request to a service SIP node in the telecommunication network;

receiving, by the proxy SIP node, from the service SIP node, a Server Failure Response message, the Server Failure Response message comprising an indication that the service SIP node cannot fulfil the SIP request due to an overload situation at the service SIP node and a SIP Reason Header field including automatic congestion level information; and restricting, by the proxy SIP node, future SIP traffic to the service SIP node based on the received Server Failure Response message, restricting the future SIP traffic including preventing at least one message from being transmitted, by the proxy SIP node, to the service SIP node.

2. The method in accordance with claim 1, wherein the method further comprises:

transmitting, by the proxy SIP node, triggered by the received Server Failure Response message, to a SIP node from which the proxy SIP node initially received the SIP request, a further Server Failure Response message, wherein the further Server Failure Response message does not comprise the indication that the service SIP node cannot fulfil the SIP request due to an overload situation at the service SIP node.

3. The method in accordance with claim 1, wherein the received Server Failure Response message, by the proxy SIP node, comprises an indication of a level of the overload situation at the service SIP node, and wherein the restricting comprises:

restricting, by the proxy SIP node, an amount of the future SIP traffic to the service SIP node based on the indication of the level of the overload situation.

4. The method in accordance with claim 1, wherein the received Server Failure Response message is a 503 Service Unavailable message.

5. The method in accordance with claim 1, wherein the SIP request is a SIP invite message for requesting a call to be established between two User Equipment, UE, in the telecommunication network.

6. The method in accordance with claim 2, wherein the received Server Failure Response message, by the proxy SIP node, comprises an indication of a level of the overload situation at the service SIP node, and wherein the restricting comprises:

restricting, by the proxy SIP node, an amount of the future SIP traffic to the service SIP node based on the indication of the level of the overload situation.

7. The method in accordance with claim 2, wherein the received Server Failure Response message is a 503 Service Unavailable message.

8. A method of handling an overload situation of a Session Initiation Protocol, SIP, node in a telecommunication network, wherein the method comprises:

receiving, by a service SIP node in the telecommunication network, from a proxy SIP node in the telecommunication network, an SIP request for requesting a service in the telecommunication network;

detecting, by the service SIP node, an overload situation at the service SIP node; and transmitting, by the service SIP node, to the proxy SIP node, a Server Failure Response message, the Server Failure Response message comprising an indication that the service SIP node cannot fulfil the SIP request due to an overload situation at the service SIP node and a SIP Reason Header field including automatic congestion level information, the Server Failure Response message triggering the proxy SIP node to restrict future SIP traffic to the service SIP node including preventing at least one message from being transmitted, by the proxy SIP node, to the service SIP node.

9. The method in accordance with claim 8, wherein the transmitted received Server Failure Response message, by the service SIP node, comprises an indication of a level of the overload situation at the service SIP node.

10. The method in accordance with claim 8, wherein the transmitted Server Failure Response message is a 503 Service Unavailable message.

11. The method in accordance with claim 8, wherein the SIP request is a SIP invite message for requesting a call to be established between two User Equipment, UE, in the telecommunication network.

12. A proxy Session Initiation Protocol, SIP, node for supporting the handling of an overload situation of a SIP node in a telecommunication network, the proxy SIP node comprising:

receive equipment configured to receive an SIP request for requesting a service in telecommunication network;

transmit equipment configured to forward the SIP request to a service SIP node in the telecommunication network;

the receive equipment being further configured to receive, from the service SIP node, a Server Failure Response message, the Server Failure Response message comprising an indication that the service SIP node cannot fulfil the SIP request due to an overload situation at the service SIP node and a SIP Reason Header field including automatic congestion level information; and the proxy SIP node further comprises process equipment configured to restrict future SIP traffic to the service SIP node based on the received Server Failure Response message, restricting the future SIP traffic including preventing at least one message from being transmitted, by the proxy SIP node, to the service SIP node.

13. The proxy SIP node in accordance with claim 12, wherein the transmit equipment is further configured to transmit, triggered by the received Server Failure Response message, to a SIP node from which the proxy SIP node initially received the SIP request, a further Server Failure Response message, wherein the further Server Failure Response message does not comprise the indication that the service SIP node cannot fulfil the SIP request due to an overload situation at the service SIP node.

14. The proxy SIP node in accordance with claim 12, wherein the received Server Failure Response message, by the proxy SIP node, comprises an indication of a level of the overload situation at the service SIP node, and wherein the process equipment is further configured to restrict an amount of the future SIP traffic to the service SIP node based on the indication of the level of the overload situation.

15. The proxy SIP node in accordance with claim 12, wherein the received Server Failure Response message is a 503 Service Unavailable message.

16. The proxy SIP node in accordance with claim 12, wherein the SIP request is a SIP invite message for requesting a call to be established between two User Equipment, UE, in the telecommunication network.

17. A service Session Initiation Protocol, SIP, node for supporting the handling of an overload situation of a Session Initiation Protocol, SIP, node in a telecommunication network, the service SIP node comprising:

receive equipment configured to receive, from a proxy SIP node in the telecommunication network, an SIP request for requesting a service in the telecommunication network;

detect equipment configured to detect an overload situation at service SIP node;

transmit equipment configured to transmit to the proxy SIP node, a Server Failure Response message, the Server Failure Response message comprising an indication that the service SIP node cannot fulfil the SIP request due to an overload situation at the service SIP node and a SIP Reason Header field including automatic congestion level information, the Server Failure Response message triggering the proxy SIP node to restrict future SIP traffic to the service SIP node including preventing at least one message from being transmitted, by the proxy SIP node, to the service SIP node.

18. The service SIP node in accordance with claim 17, wherein the transmitted received Server Failure Response message comprises an indication of a level of the overload situation at the service SIP node.

19. The service SIP node in accordance with claim 17, wherein the transmitted Server Failure Response message is a 503 Service Unavailable message.

20. The service SIP node in accordance with claim 17, wherein the SIP request is a SIP invite message for requesting a call to be established between two User Equipment, UE, in the telecommunication network.

* * * * *